United States Patent
Hwang et al.

(10) Patent No.: US 8,456,667 B2
(45) Date of Patent: Jun. 4, 2013

(54) METHOD AND APPARATUS FOR INSTALLING PRINTER DRIVER OF IMAGE FORMING APPARATUS IN PRINTING ENVIRONMENT USING UNIVERSAL PRINTER DRIVER

(75) Inventors: Tae-kyung Hwang, Suwon-si (KR); Jung-soo Seo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1048 days.

(21) Appl. No.: 12/044,206

(22) Filed: Mar. 7, 2008

(65) Prior Publication Data

US 2009/0033982 A1 Feb. 5, 2009

(30) Foreign Application Priority Data

Aug. 1, 2007 (KR) .................. 10-2007-0077455

(51) Int. Cl.
- G06F 3/12 (2006.01)
- G06F 15/00 (2006.01)
- G06F 17/00 (2006.01)
- G06F 17/28 (2006.01)
- G06K 15/00 (2006.01)
- H04N 1/60 (2006.01)

(52) U.S. Cl.
USPC .......... 358/1.15; 358/1.1; 358/1.18; 358/1.9; 715/200; 715/700; 715/788

(58) Field of Classification Search
USPC ................. 358/1.15, 1.18, 1.9, 501, 426.04, 358/448, 462, 476; 719/322, 321, 328, 327, 719/311, 319; 715/700, 788, 793, 759, 277, 715/200, 867
See application file for complete search history.

(56) References Cited

U.S. PATENT DOCUMENTS

| | | | |
|---|---|---|---|
| 5,228,118 A * | 7/1993 | Sasaki .................. | 358/1.13 |
| 6,671,063 B1 * | 12/2003 | Iida ....................... | 358/1.15 |
| 6,757,070 B1 * | 6/2004 | Lin et al. ................ | 358/1.1 |
| 7,852,497 B2 * | 12/2010 | Sato ....................... | 358/1.13 |
| 2004/0093491 A1 * | 5/2004 | Ebata ..................... | 713/100 |
| 2005/0060649 A1 * | 3/2005 | Kimura et al. ......... | 715/526 |
| 2006/0232810 A1 * | 10/2006 | Kishino ................. | 358/1.13 |
| 2007/0216943 A1 * | 9/2007 | Funamizu .............. | 358/1.15 |
| 2007/0245345 A1 * | 10/2007 | Yamada ................. | 717/174 |

* cited by examiner

Primary Examiner — Benny Q Tieu
Assistant Examiner — Ngon Nguyen
(74) Attorney, Agent, or Firm — Staas & Halsey LLP (57) ABSTRACT

A method and apparatus for installing a printer driver of an image forming apparatus in a printing environment using a universal printer driver, the method including: displaying one or more functions that are supported by one or more image forming apparatuses connected to the printing environment; selecting at least one function from among the displayed functions; and installing a printer driver of a connected image forming apparatus that supports the selected at least one function. Thus, even if a model name of the printer driver of the image forming apparatus to be used is not recognized, a printer driver of the image forming apparatus that supports the functions to be used can be installed.

21 Claims, 5 Drawing Sheets

Configuration Report

```
Date/Time      : OCT-09-2006 11:17PM MON
Fax Number     :
Fax Name       :
Model Name     : SCX-6x22 Series
```

| Options | Item | Status |
|---|---|---|
| Default Copies | [1-999] | 1 |
| Default Reduce/Enlarge | [Org.(100%)/LGL->LTR(78%)...] | Org.(100%) |
| Default Darkness | [Light/Normal...] | Normal |
| Default Original Type | [Text/ Text/Photo...] | Text |
| Darkness | [Light/Normal...] | Normal |
| Resolution | [Standard/Fine...] | Standard |
| Ring To Answer | [1-7] | 1 |
| Receive Mode | [Fax/Tel...] | Fax |
| Redial Term | [1-15] | 3 |
| Redial Times | [0-13] | 2 |
| Send Report | [On/Off...] | On-Err |
| Auto Report | [On/Off] | On |
| Auto Reduction | [On/Off] | On |
| Discard Size | [0-30] | [20 mm] |
| RCV Start Code | [0-9] | [*9*] |
| DRPD Mode | [On/Off] | Off |
| Ignore Toner | [On/Off] | Off |
| Paper Size(Tray 1) | [Letter/A4...] | Letter |
| MP Tray Size | [Letter/A4...] | Letter |
| Copy Tray | [Tray 1/Tray 2...] | Auto |
| Fax Tray | [Tray 1/Tray 2...] | Auto |
| Paper Type | [Plain Paper/Bond...] | Plain Paper |
| Send Forward/RCV Forward | [On/Off...] | Off/Off |
| Junk Fax Setup | [On/Off] | Off |
| Secure Receive | [On/Off] | Off |
| Prefix Dial | [Fax Number] | [] |
| Stamp RCV Name | [On/Off] | Off |
| ECM Mode | [On/Off] | On |
| Image TCR | [On/Off] | On |
| Speaker | [On/Off...] | Comm. |
| Ringer | [Off/Low...] | Med |
| Key Sound | [On/Off] | Off |
| Alarm Sound | [On/Off] | On |
| Clock Mode | [12 Hours/24 Hours] | 12 Hours |
| Language | [English/FRANCAIS...] | English |
| Default Mode | [Fax/Copy] | Fax |
| Power Save | [5/10/15...] | 30 Min |
| Timeout | [15/30/60...] | [30 Sec] |
| Scan PWR Save | [0.5/1/2] | 0.5 Hours |
| Time Secure Receive | [Off/On Default/...] | Off |

```
Firmware/Engine Version       : OS 1.01.01.02    01-17-2007    1.15.00
Emulation Version             : PCL5e 5.44 11-15-2006          PCL6 5.38  11-08-2006
                                PS3 V1.49.56 10-09-2006
DADF Version                  : 0.40
Total Page Counts             : 74
Toner/Drum Page Counts        : 1330 (Normal)                  74 (Normal)
DADF/Platen Scan Page Counts  : 3                              36
CRUM Vendor/Serial            : SAMSUNG(EXPORT)                CRUM-06050467850
IP Address/Memory Size        : 10.88.194.241                  64 Mbyte
```

FOLLOWING IS A LIST OF FOUND PRINTERS.
SELECT DRIVER FROM THE LIST BELOW.

| PRINTER NAME | PRINTING SPEED | PRINTING ON BOTH SIDES | COLOR PRINTING | Offeset | STAPLE |
|---|---|---|---|---|---|
| Samsung CLP-650 Series | 20ppm | O | O | O | O |
| Samsung SCX-6x45 Series | 45ppm | O | X | O | O |
| Xerox Phaser 3125 PS | 25ppm | O | O | X | O |
| Samsung ML-4050 Series | 40ppm | O | X | O | X |
| HP Color LaserJet 5c Series | 15ppm | O | O | X | X |
| HP LaserJet 550 Series | 30ppm | O | X | X | X |

FIG. 6

METHOD AND APPARATUS FOR INSTALLING PRINTER DRIVER OF IMAGE FORMING APPARATUS IN PRINTING ENVIRONMENT USING UNIVERSAL PRINTER DRIVER

CROSS-REFERENCE TO RELATED APPLICATION

This application claims the benefit of Korean Patent Application No. 2007-77455, filed on Aug. 1, 2007 in the Korean Intellectual Property Office, the disclosure of which is incorporated herein in its entirety by reference.

BACKGROUND OF THE INVENTION

1. Field of the Invention

Aspects of the present invention relate to a method and apparatus for installing a printer driver of an image forming apparatus in a printing environment using a universal printer driver.

2. Description of the Related Art

In general, when documents prepared in a host apparatus (such as a personal computer) are printed by an image forming apparatus (such as a printer), a printer driver is needed in the host apparatus to drive the image forming apparatus. Specifically, the printer driver converts data prepared in an application program of the host apparatus into data that can be interpreted by the image forming apparatus. Furthermore, the host apparatus performs two-way communication with the image forming apparatus through the printer driver.

Generally, since interpretable data is different in each image forming apparatus, the printer driver corresponding to the model of the image forming apparatus to be used should be installed in the host apparatus. Accordingly, in order to reduce an inconvenience from installing a corresponding printer driver to the host apparatus each time a new image forming apparatus is used, a Universal Printer Driver (UPD) has been introduced.

Figure 1:
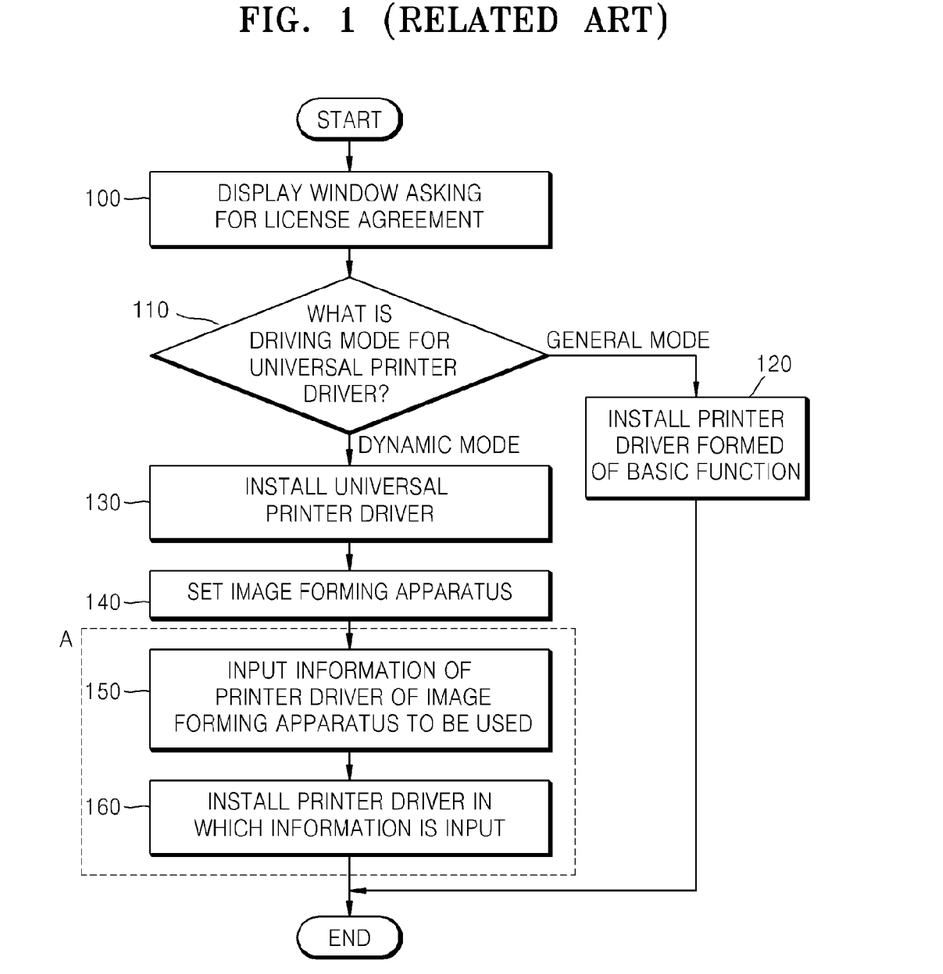
FIG. 1 is a flowchart of a conventional method of installing a printer driver of an image forming apparatus in a printing environment using a universal printer driver.

FIG. 1 is a flowchart of a conventional method of installing a printer driver of an image forming apparatus in a printing environment using a UPD. Referring to FIG. 1, a window asking for a license agreement is displayed in operation 100. That is, before the universal printer driver is installed, the license agreement must first be consented to. Thus, if the license agreement is rejected, the UPD is not installed.

In operation 110, a driving mode of the UPD is checked. The UPD can be driven in two modes (i.e., a general mode and a dynamic mode). When the UPD is driven in a general mode, the printer driver having a basic function is installed, regardless of the model of the image forming apparatus connected to the host apparatus. Accordingly, the host apparatus can operate and communicate with the image forming apparatus as in the conventional method of using the printer driver. On the other hand, when the UPD is driven in a dynamic mode, the printer driver is installed after receiving information from the image forming apparatus to be used so that a driving mode of the UPD can be checked. When the UPD is driven in a general mode, operation 120 is performed, and when the universal printer driver is driven in a dynamic mode, operation 130 is performed.

In operation 120, the printer driver having a basic function is installed. Specifically, when the UPD is driven in a general mode, an add printer wizard provided from an operation system (OS) may pop up, the UPD is installed, and a driver displaying user interface with a basic function is installed, thereby completing installation.

In operation 130, the UPD is installed in a dynamic mode. In operation 140, the image forming apparatus is set. In other words, it is determined whether to set as a standard printer and to print a test page. In operation 150, information of the printer driver of the image forming apparatus to be used is input. After searching for a model name of the printer driver of the image forming apparatus, the model name of the printer driver to be used from among the model names found by the searching is input. In operation 160, the printer driver of the image forming apparatus in which information is input is installed.

In operations 150 and 160, when the UPD is driven in a dynamic mode in a printing environment using the UPD, a process of inputting information of the printer driver of the image forming apparatus to be used is needed. In order to input information of the printer driver of the image forming apparatus, the exact model name and/or number of the printer driver to be used should be known. However, since there are various types of printer drivers that are distributed in the market, it is almost impossible to exactly recognize a model name of the printer driver. Accordingly, it is difficult to install the printer driver of the image forming apparatus to be used. In addition, information on functions supported by the image forming apparatus is difficult to recognize with only the model name of the printer driver, resulting in a difficulty in installing the printer driver of the image forming apparatus that supports functions to be used.

SUMMARY OF THE INVENTION

Aspects of the present invention provide a method of installing a printer driver of an image forming apparatus in a printing environment using a universal printer driver according to selected functions of connected image forming apparatuses, such that if the model name of a printer driver of an image forming apparatus to be used is not recognized, the printer driver of the image forming apparatus that supports the functions to be used can still be installed.

Aspects of the present invention also provide a computer-readable recording medium having embodied thereon a computer program for executing the method described above.

According to an aspect of the present invention, there is provided a method of installing a printer driver of an image forming apparatus in a printing environment using a universal printer driver, the method including: displaying functions that are supported by one or more image forming apparatuses connected to the printing environment; selecting at least one function from among the displayed functions; and installing a printer driver of a connected image forming apparatus that supports the selected at least one function.

According to another aspect of the present invention, there is provided a computer-readable recording medium having embodied thereon a computer program for executing the method of installing a printer driver of an image forming apparatus in a printing environment using a universal printer driver.

According to another aspect of the present invention, there is provided an apparatus for installing a printer driver of an image forming apparatus in a printing environment using a universal printer driver, the apparatus including: a displaying unit to display functions that are supported by image forming apparatuses connected to the printing environment; a selecting unit to select at least one function from among the displayed functions; and an installing unit to install a printer driver of a connected image forming apparatus that supports the selected functions.

According to another aspect of the present invention, there is provided a method of installing a printer driver of an image forming apparatus in a printing environment using a universal printer driver (UPD), the method including: selecting at least one function that is supported by one or more image forming apparatuses connected to the printing environment; and installing a printer driver of a connected image forming apparatus that supports the selected at least one function.

According to another aspect of the present invention, there is provided an apparatus for installing a printer driver of an image forming apparatus in a printing environment using a universal printer driver, the apparatus including: a selecting unit to select at least one function that is supported by one or more image forming apparatus connected to the printing environment; and an installing unit to install a printer driver of a connected image forming apparatus that supports the selected at least one function.

According to still another aspect of the present invention, there is provided a computer user interface menu selection method for allowing a user to select a driver of a connected image forming apparatus to be installed by a computer, the method including: simultaneously displaying on a display device a plurality of selectable functions of connected image forming apparatuses; selecting at least one function from among the plurality of selectable functions; according to the selected at least one function, displaying one or more connected image forming apparatuses having functions in common with the selected at least one function; selecting a connected image forming apparatus from the displayed one or more connected image forming apparatuses; and installing a printer driver of the selected image forming apparatus.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages of the present invention will become more apparent by describing in detail exemplary embodiments thereof with reference to the attached drawings in which:

FIG. 3 is a diagram of a configuration report illustrating functions of an image forming apparatus according to an embodiment of the present invention;

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
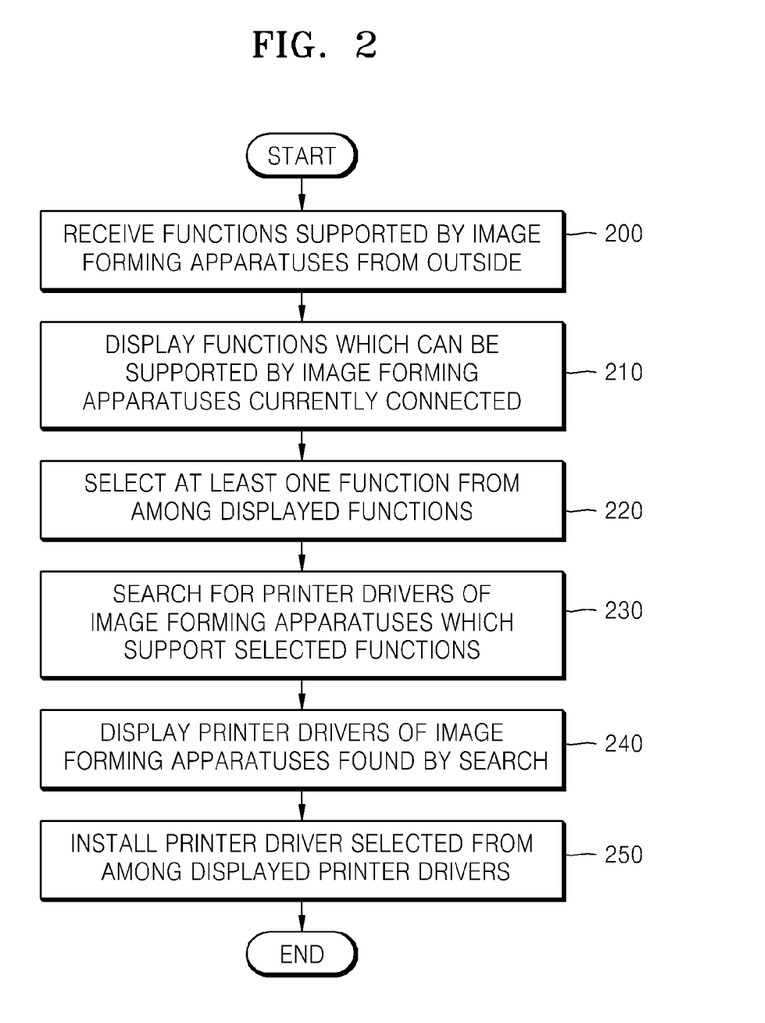
FIG. 2 is a flowchart of a method of installing a printer driver of an image forming apparatus in a printing environment using a universal printer driver according to an embodiment of the present invention.

FIG. 2 is a flowchart of a method of installing a printer driver of an image forming apparatus in a printing environment using a universal printer driver (UPD) according to an embodiment of the present invention. The method of installing a printer driver of an image forming apparatus in a printing environment using a UPD according to an embodiment of the present invention corresponds in part to the conventional method illustrated in FIG. 1. Specifically, in the following description, it is assumed that operations 100 through 140 of FIG. 1 have already been performed. Furthermore, the method of installing the printer driver may apply to a printing environment in which a plurality of image forming apparatuses are connected to a host apparatus.

Referring to FIG. 2, in operation 200, functions supported by one or more image forming apparatuses connected to a host apparatus are received from an outside source. The one or more image forming apparatus may be connected directly to the host apparatus and/or may be connected to the host apparatus through a wired or wireless network. For example, a polling is performed to each connected image forming apparatuses so as to receive functions supported by the image forming apparatuses. The receiving of the functions supported by the image forming apparatus may satisfy a condition in which a program parses data received from the image forming apparatus by using a common interface between a program installed to the host apparatus and the image forming apparatus. In this case, data can be written to XML or Hexa-Code. However, it is understood that aspects of the present invention are not limited thereto. For example, the functions supported by the image forming apparatuses may be received from a separate server, instead of from the currently connected image forming apparatuses.

In operation 210, the functions that are supported by the currently connected image forming apparatuses are displayed. For example, the data received from the one or more image forming apparatuses (or another outside source) is analyzed and the functions of the image forming apparatuses that can be used when connected to the host apparatus are displayed.

FIG. 3 is a diagram of a configuration report illustrating functions of a connected image forming apparatus according to an embodiment of the present invention. As illustrated in FIG. 3, all functions of the image forming apparatus are included in the configuration report. In operation 210, whole functions that include all of the information illustrated in the configuration report of FIG. 3 can be displayed. However, it is understood that aspects of the present invention are not limited thereto. For example, only common functions that are commonly supported by the image forming apparatus, or specialized functions that distinguish the image forming apparatus may be displayed. In other words, in operation 210, the functions of the connected image forming apparatuses can be classified into whole functions, common functions, or specialized functions to be displayed.

Figure 4A:
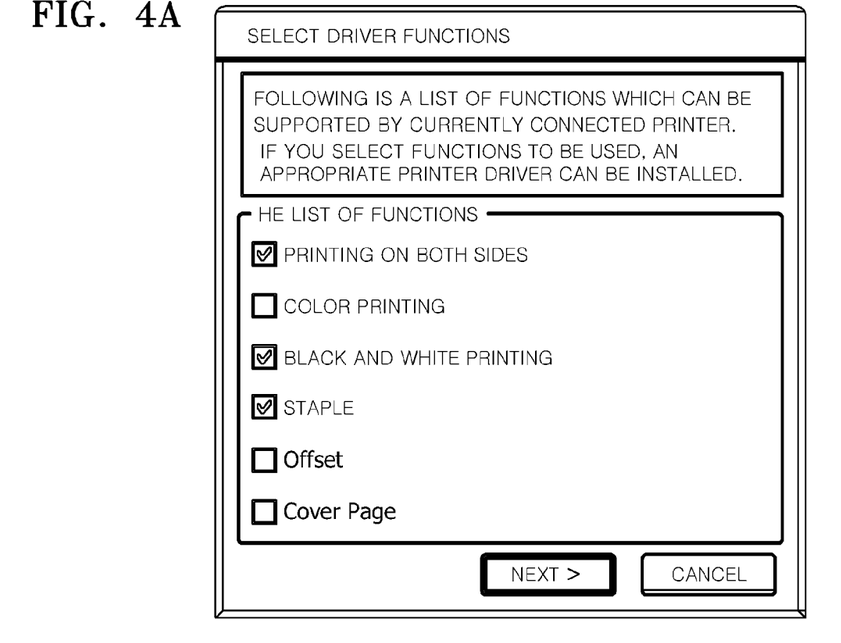
FIG. 4A illustrates a list of functions of an image forming apparatus displayed according to an embodiment of the present invention.
Figure 4B:
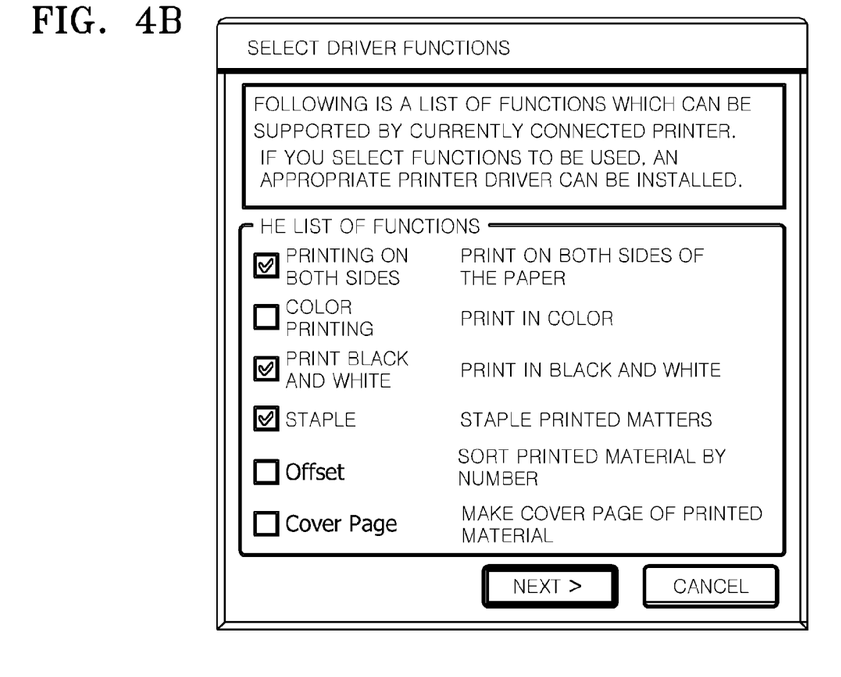
FIG. 4B illustrates a list of functions of an image forming apparatus displayed according to another embodiment of the present invention.

FIG. 4A illustrates a list of functions of an image forming apparatus displayed according to an embodiment of the present invention, and FIG. 4B illustrates a list of functions of an image forming apparatus displayed according to another embodiment of the present invention. As shown, the selectable functions include duplex printing (i.e., printing on both sides), color printing, black and white printing, offset, and cover page. However, it is understood that the functions are not limited thereto.

In operation 210, as illustrated in FIG. 4A, only a list of functions that are supported by an image forming apparatus that is connected to the host apparatus is displayed. In addition, as illustrated in FIG. 4B, descriptions of the functions are added to the list of functions that are supported by the image forming apparatus connected to the host apparatus, and displayed. It is understood that the list of functions that are supported by the image forming apparatus may be displayed by various methods, and are not limited to those methods illustrated in FIGS. 4A and 4B. Furthermore, according to an aspect of the present invention, the list of functions may be obtained based on a model and/or manufacturer of the image forming apparatus.

According to other aspects of the present invention, functions supported by connected image forming apparatuses and received from an outside source are not displayed to be selected. Rather, a predetermined list of functions may be displayed.

Referring back to FIG. 2, in operation 220, at least one function from among the displayed functions (operation 210) is selected. As illustrated in FIG. 4A or FIG. 4B, when a function of the image forming apparatus to be used is checked from the displayed list of functions by an input device (such as a mouse, a keyboard, or a touch screen), the corresponding function is selected in the displayed list of functions. As shown, the selected functions include the duplex printing, black and white printing, and staple functions. The non-selected functions are the color printing, offset, and the cover page functions. However, it is understood that the selected functions and the non-selected functions are not limited thereto.

In operation 230, printer drivers of image forming apparatuses that support the selected functions are searched for. Specifically, one or more printer drivers of the image forming apparatuses that support the selected functions are searched for from among the image forming apparatuses connected to the current host apparatus.

In operation 240, the printer drivers of the image forming apparatuses found by the searching (operation 230) are displayed.

Figure 5:
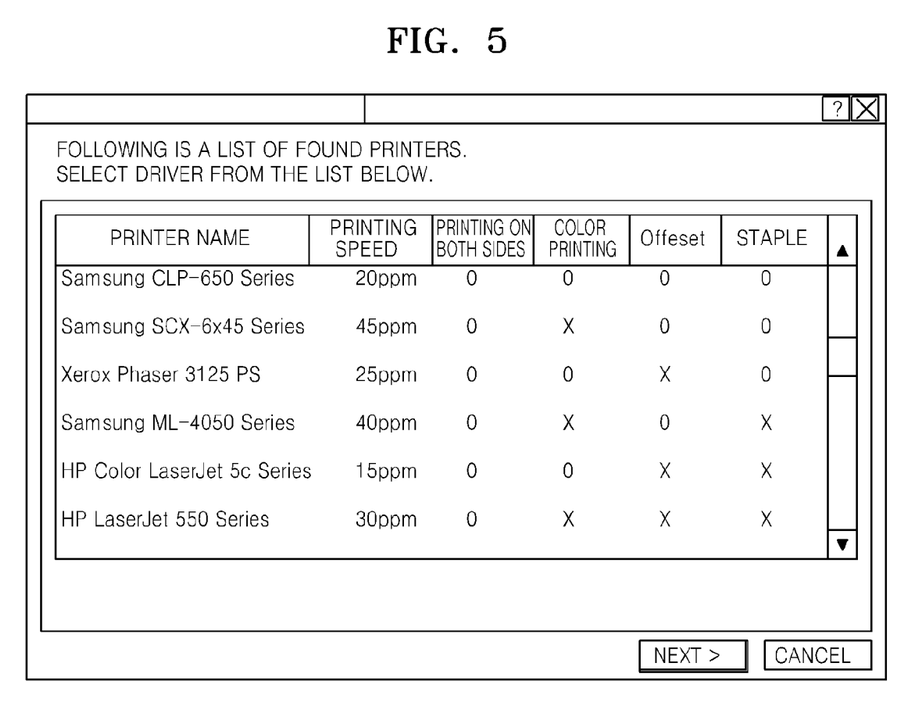
FIG. 5 illustrates a list of printer drivers of image forming apparatuses displayed according to an embodiment of the present invention.

FIG. 5 illustrates a list of printer drivers of image forming apparatuses displayed according to an embodiment of the present invention. In operation 240, as illustrated in FIG. 5, a list of the printer drivers found by the searching (operation 230) and the functions that are supported by the found printer drivers are displayed. The list of the found printer drivers may be displayed in the order in which the printer drivers correspond to the selected functions. Also, when a tab (i.e. function) is selected from among the list of functions, the printer drivers for which the function corresponding to the selected tab is supported may be firstly classified and displayed. In addition, information (such as a printing speed and a location of the image forming apparatus) may also be displayed so as to help a selecting of the image forming apparatus to be used. A user can determine the priority order of the list of functions that are supported according to a user's preference and the list of functions can be arranged according to the priority order. When the image forming apparatuses are displayed according to model, all found models may be displayed regardless of a manufacturer, or only the model of a specified manufacturer may be displayed. In other words, according to a pre-defined or selected priority order, the printer driver of the image forming apparatus that supports the selected functions can be displayed. As shown, the list includes an "or" search in which printers having at least one selected function in FIG. 4A are shown. However, it is understood that the search can be a more limiting "and" search where all checked functions must exist.

In operation 250, the printer driver selected from among the displayed printer drivers is installed. Thus, according to the method of installing the printer driver of the image forming apparatus in a printing environment using a UPD, even if the model name of the printer driver of the image forming apparatus to be used is not recognized, the printer driver of the image forming apparatus that supports the functions to be used can be installed.

Figure 6:
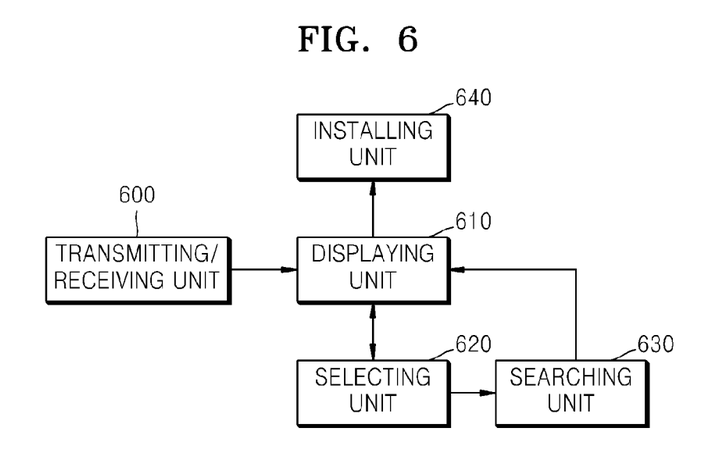
FIG. 6 is a block diagram of an apparatus for installing a printer driver of an image forming apparatus in a printing environment using a universal printer driver according to an embodiment of the present invention.

FIG. 6 is a block diagram of an apparatus for installing a printer driver of an image forming apparatus in a printing environment using a UPD according to an embodiment of the present invention. Referring to FIG. 6, the apparatus for installing the printer driver of the image forming apparatus includes a transmitting/receiving unit 600, a displaying unit 610, a selecting unit 620, a searching unit 630, and an installing unit 640. While not required, the apparatus can be included in the host apparatus, in a computer or a server connected to the host apparatus, or in a stand alone unit.

The transmitting/receiving unit 600 receives functions that can be supported by one or more image forming apparatuses connected to a host apparatus from an outside source. For example, the transmitting/receiving unit 600 may poll the image forming apparatuses connected to the host apparatus and receive the functions that can be supported by the image forming apparatuses from the image forming apparatuses. In this case, a common interface between a program installed in the host apparatus and the one or more image forming apparatuses is used and the program installed in the host apparatus parses data received from the image forming apparatus to receive (i.e., determine) the functions. However, it is understood that aspects of the present invention are not limited thereto. For example, the transmitting/receiving unit 600 may receive the functions supported by the one or more image forming apparatuses from a separate server, instead of the current connected image forming apparatuses.

The displaying unit 610 displays the functions received by the transmitting/receiving unit 600. That is, the functions that are supported by the image forming apparatuses connected to the current host apparatus are displayed. The displaying unit 610 can display whole functions that include information illustrated in the configuration report of FIG. 3. However, it is understood that aspects of the present invention are not limited thereto. For example, the displaying unit 610 can display only common functions that are commonly supported by the image forming apparatus, or specialized functions that distinguish the image forming apparatus. In addition, as illustrated in FIG. 4A, the displaying unit 610 can display only the list of the functions that are supported by models of the image forming apparatuses connected to the host apparatus, or as illustrated in FIG. 4B, the displaying unit 610 can add the descriptions of the functions to the list of functions that are supported by the image forming apparatuses that are connected to the host apparatus, and displays the list of functions including the descriptions. It is understood that the list of functions that are supported by the image forming apparatuses may be displayed by various methods.

The selecting unit 620 selects at least one function from among the displayed functions. When at least one function is checked from the displayed list of functions through an input device (such as a mouse) as illustrated in FIG. 4A or FIG. 4B, the selecting unit 620 selects the function corresponding to the checked function.

The searching unit 630 searches for one or more image forming apparatuses that support the functions selected by the selecting unit 620. Specifically, the searching unit 630 searches for printer drivers of one or more connected image forming apparatuses that support the selected functions. The printer drivers searched for by the searching unit 630 are displayed through the displaying unit 610. Here, the list of the printer drivers displayed is illustrated in FIG. 5.

That is, the displaying unit 610 displays the list of the found printer drivers and the functions that can be supported by the found printer drivers (as illustrated in FIG. 5). The printer drivers may be displayed in the order in which the printed drivers most correspond to the selected functions. Also, when a tab (i.e., function) is selected from among the list of functions, the printer drivers for which the functions corresponding to the selected tab is supported may be first classified and displayed. In addition, information (such as printing speed and/or a location of each image forming apparatus) may be additionally displayed so as to help selecting the image forming apparatus to be used. A user can determine the priority order of the list of functions that are supported according to a user's preference and the list of functions can be arranged according to the priority order. When the image forming apparatuses are displayed according to model, all found models may be displayed regardless of a manufacturer, or only the model of a specified manufacturer may be displayed. In other words, the displaying unit 610 can display the printer driver of the image forming apparatus that supports the selected functions according to a pre-stored or selected priority order.

The installing unit 640 selects the printer driver from among the displayed printer drivers. When the printer driver to be used is selected from among the displayed printer drivers, the selected printer driver is installed. Thus, according to aspects of the present invention, even if the model name of the image forming apparatus to be used is not recognized or known, the printer driver of the image forming apparatus that supports the functions to be used can be installed.

Aspects of the present invention can be written as computer programs and can be implemented in general-use digital and/or special purpose computers that execute the programs using a computer-readable recording medium. In addition, a data structure used to implement the aspects of the present invention can be written to a computer-readable recording medium through various means. Examples of the computer-readable recording medium include magnetic storage media (e.g., ROM, floppy disks, hard disks, etc.), and/or optical recording media (e.g., CD-ROMs, or DVDs).

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of installing a printer driver of an image forming apparatus in a printing environment using a universal printer driver, the method comprising:
displaying one or more functions that are supported by one or more image forming apparatuses connected to the printing environment using the universal printer driver;
selecting at least one function from among the displayed functions;
displaying one or more printer drivers of connected one or more image forming apparatuses that support the selected at least one function; and
selecting a printer driver from among the displayed one or more printer drivers of a connected image forming apparatus that supports the selected at least one function;
installing the printer driver selected from among the displayed one or more printer drivers of a connected image forming apparatus that supports the selected at least one function.

2. The method as claimed in claim 1, wherein the displaying of the one or more functions comprises receiving the functions from an outside source.

3. The method as claimed in claim 2, wherein the outside source is the one or more image forming apparatuses or a separate server.

4. The method as claimed in claim 2, wherein the receiving of the functions comprises polling the one or more image forming apparatuses.

5. The method as claimed in claim 4, wherein the polling comprises executing a program installed in a host apparatus of the printing environment to parse data received from each connected image forming apparatus by using a common interface between the host apparatus and the each connected image forming apparatus.

6. The method as claimed in claim 1, wherein the displaying of the one or more functions comprises classifying the functions into whole functions such that all of the functions are displayed, common functions such that functions common to the connected image forming apparatuses are displayed, and/or specialized functions such that functions that distinguish an image forming apparatus are displayed.

7. The method as claimed in claim 1, wherein the displaying of the one or more functions comprises classifying each function by model and/or by manufacturer of a connected image forming apparatus that performs the function.

8. The method as claimed in claim 1, wherein the displaying of the one or more functions comprises displaying descriptions of the functions.

9. The method as claimed in claim 1, wherein the displaying of the printer drivers of the connected image forming apparatuses that support the selected at least one function comprises displaying the printer drivers according to a pre-stored priority order.

10. The method as claimed in claim 1, wherein the displaying of the printer drivers of the connected image forming apparatuses that support the selected at least one functions comprises:
searching for the printer drivers of the image forming apparatuses that support the selected functions; and
displaying the printer drivers found by the searching.

11. An apparatus for installing a printer driver of an image forming apparatus in a printing environment using a universal printer driver, the apparatus comprising:
a display device to display one or more functions that are supported by one or more image forming apparatuses connected to the printing environment using the universal printer driver;
a selecting unit to detect a selection of at least one function from among the displayed functions, wherein the display device displays one or more printer drivers of connected one or image forming apparatuses that support the selected at least one function; and
an installing unit to select a printer driver and to install the selected printer driver from among the displayed one or more printer drivers of a connected image forming apparatus that supports the selected at least one function.

12. The apparatus as claimed in claim 11, further comprising a transmitting/receiving unit to receive the functions from an outside source, wherein the display device displays the functions received by the transmitting/receiving unit.

13. The apparatus as claimed in claim 12, wherein the outside source is the one or more image forming apparatuses or a separate server.

14. The apparatus as claimed in claim 11, wherein the display device displays the one or more functions by classifying the functions into whole functions such that all of the functions are displayed, common functions such that functions common to the connected image forming apparatuses are displayed, and/or specialized functions such that functions that distinguish an image forming apparatus are displayed.

15. The apparatus as claimed in claim 11, wherein the display device displays the one or more functions by classifying each function by model and/or by manufacturer of a connected image forming apparatus that performs the function.

16. The apparatus as claimed in claim 11, wherein the display device displays descriptions of the functions.

17. The apparatus as claimed in claim 11, wherein the display device displays the printer drivers of the connected image forming apparatuses that support the selected at least one function according to a pre-stored priority order.

18. The apparatus as claimed in claim 11, further comprising a searching unit to search for the printer drivers of the image forming apparatuses that support the selected at least one function, wherein the display device displays the printer drivers found by the searching.

19. A method of installing a printer driver of an image forming apparatus in a printing environment using a universal printer driver (UPD), which is executed by at least one processing device, the method comprising:

selecting at least one displayed function that is determined using the UPD to be supported by one or more image forming apparatuses connected to the printing environment;

displaying one or more printer drivers of connected image forming apparatuses that support the selected at least one displayed function; and installing a printer driver, selected by a user from among the one or more displayed printer drivers which correspond to the selected at least one displayed function, of a connected image forming apparatus that supports the selected at least one displayed function.

20. An apparatus for installing a printer driver of an image forming apparatus in a printing environment using a universal printer driver (UPD), the apparatus comprising:

a display device to display an interface showing a plurality of selectable functions;

an input device to select at least one displayed function that is determined using the UPD to be supported by one or more image forming apparatuses connected to the printing environment;

a selecting unit to detect the selection of the at least one displayed function that is supported by the one or more image forming apparatuses connected to the printing environment, wherein the display device displays one or more printer drivers of connected image forming apparatuses that support the selected at least one displayed function; and an installing unit to select a printer driver from among the one or more displayed printer drivers and to install the selected printer driver, from among the one or more displayed printer drivers corresponding to the selected at least one displayed function, of a connected image forming apparatus that supports the selected at least one displayed function.

21. The apparatus as claimed in claim 20, wherein the display device displays a search result of connected image forming apparatuses according to the selected at least one function, wherein the selected at least one function is selected from the plurality of selectable functions on the interface.

* * * * *